(12) United States Patent
Correa

(10) Patent No.: US 6,181,385 B1
(45) Date of Patent: Jan. 30, 2001

(54) METHOD FOR PROCESSING TRANSITIONAL REGIONS IN A PICTURE SIGNAL

(75) Inventor: Carlos Correa, Villingen-Schwenningen (DE)

(73) Assignee: Deutsche Thomson-Brandt GmbH, Villingen-Schwenninghen (DE)

(*) Notice: Under 35 U.S.C. 154(b), the term of this patent shall be extended for 0 days.

(21) Appl. No.: 09/080,675

(22) Filed: May 18, 1998

(30) Foreign Application Priority Data

May 28, 1997 (DE) .............................. 197 22 358

(51) Int. Cl.$^7$ ...................................................... H04N 5/21
(52) U.S. Cl. .................. 348/625; 348/631; 348/606; 348/624; 348/630; 348/382; 348/266
(58) Field of Search ........................ 348/625, 631, 348/606, 607, 630, 627, 624, 628, 629, 252, 253; 382/266, 263, 267, 268, 269; 358/532; H04N 5/208, 5/21

(56) References Cited

U.S. PATENT DOCUMENTS

| | | | |
|---|---|---|---|
| 4,935,806 | * 6/1990 | Rabii | 348/606 |
| 5,029,004 | * 7/1991 | Shibayama | 358/162 |
| 5,151,787 | * 9/1992 | Park | 358/162 |
| 5,159,442 | * 10/1992 | Mizuta | 358/37 |
| 5,237,414 | * 8/1993 | Faroudja | 358/162 |
| 5,304,854 | * 4/1994 | Aoki et al. | 307/263 |
| 5,311,328 | 5/1994 | Murata | 358/447 |
| 5,374,964 | * 12/1994 | Rzeszewski | 348/625 |
| 5,412,432 | * 5/1995 | Hong | 348/625 |
| 5,467,145 | 11/1995 | Limberg | 348/628 |
| 5,469,225 | * 11/1995 | Hong | 348/625 |
| 5,515,112 | * 5/1996 | Penney | 348/630 |
| 5,699,126 | * 12/1997 | Hong | 348/625 |
| 5,848,181 | * 12/1998 | Ogata | 382/266 |
| 5,920,357 | * 7/1999 | Ohara | 348/625 |
| 5,926,577 | * 7/1999 | Kasahara et al. | 382/266 |
| 5,936,682 | * 8/1999 | Thomas et al. | 348/625 |
| 6,043,853 | * 3/2000 | Shimazaki et al. | 348/625 |

FOREIGN PATENT DOCUMENTS

| | | | |
|---|---|---|---|
| 3943307A1 | 7/1990 | (DE) | H04N/9/64 |
| 3919817C2 | 12/1990 | (DE) | H04N/5/208 |
| 4039122C2 | 6/1991 | (DE) | H04N/5/208 |
| 4340687C2 | 7/1994 | (DE) | H04N/5/208 |
| 0094597A2 | 11/1983 | (EP) | G06F/15/20 |
| 0384718B1 | 8/1990 | (EP) | H04N/9/64 |
| 0805603A1 | 11/1997 | (EP) | H04N/9/64 |

OTHER PUBLICATIONS

German Search Report dated: Feb. 5, 1998.

* cited by examiner

Primary Examiner—John K. Peng
Assistant Examiner—Jean W. Désir
(74) Attorney, Agent, or Firm—Joseph S. Tripoli; Eric P. Herrmann

(57) ABSTRACT

A method is proposed for processing transitional regions in a picture signal. The picture signal comprises a sequence of digital pixel values. A number of adjacent pixel values, which contain a processing pixel value, are combined to form a processing block. A corrected pixel value is calculated for the processing pixel value. The maximum and minimum pixel values are first determined in the processing block to define the transitional region. The transitional region is then split into a number of sections on the basis of the magnitude of pixel value. Finally, a determination is made as to the section in which the processing pixel value is located. The processing pixel value is allocated a corresponding correction value in order to increase, to reduce or to leave unchanged the processing pixel value, in accordance with a predetermined transfer function.

12 Claims, 6 Drawing Sheets

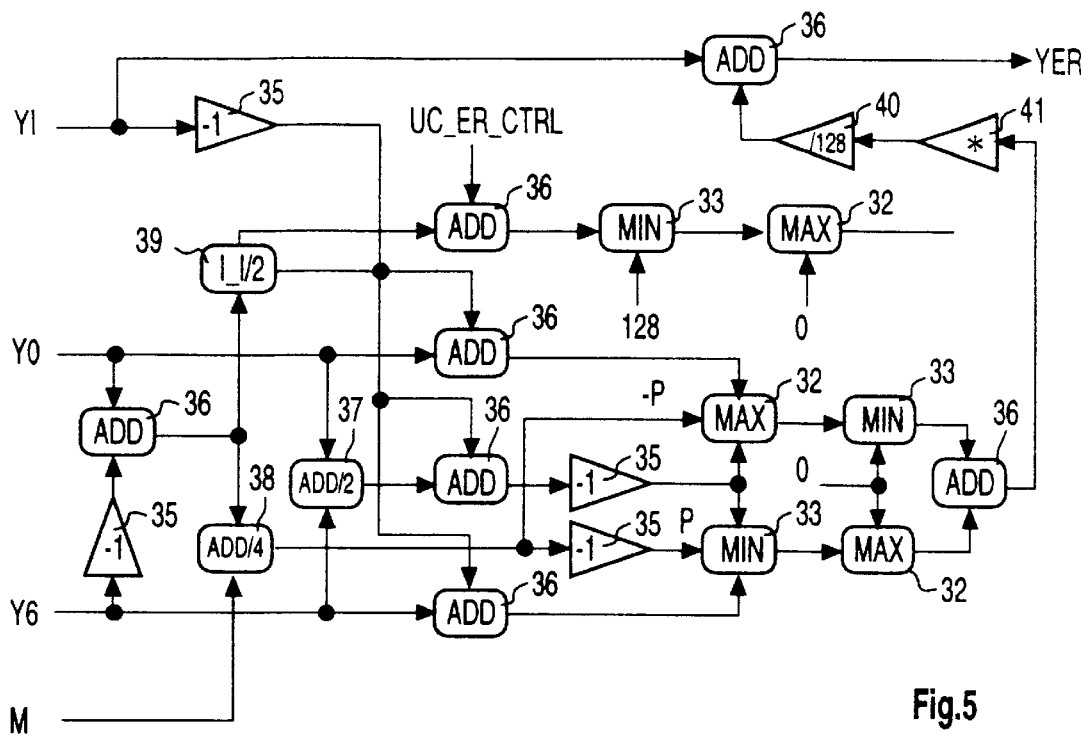
Fig.5
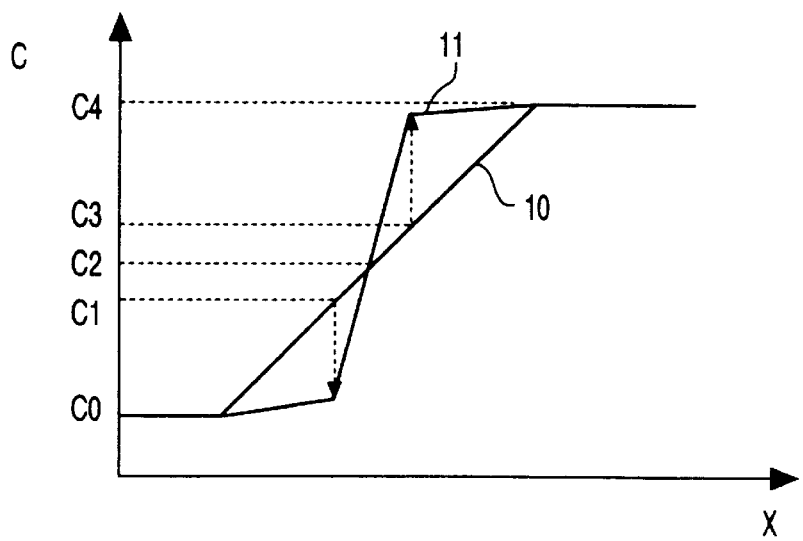
Fig.6
| C00 | C01 | C02 | C03 | C04 | C05 | C06 | C07 | C08 |
Fig.7

METHOD FOR PROCESSING TRANSITIONAL REGIONS IN A PICTURE SIGNAL

The invention relates to a method for processing transitional regions in a digital picture signal.

PRIOR ART

The invention is based on a method for processing transitional regions in a picture signal, of the generic type of the independent Claim 1. A method for picture signal edge correction has been disclosed, for example, in German Patent Specification DE 40 39 122 C2. In the case of the method which is known from this patent, a digitized luminance signal of a video signal is delayed in four series-connected delay circuits. The delayed luminance signals are processed in downstream stages, namely subtraction circuits, absolute-value circuits, comparators and multiplying circuits. These processing stages are used to define the start of an edge and the end of an edge. When the start of an edge is identified, control signals are produced such that one of the delayed luminance signals is output instead of the undelayed luminance signal. This results in an increase in the gradient of a transition in the picture signal since the upper luminance value of the transition from one sample value to the next is virtually output without having to output intermediate values.

INVENTION

On the basis of the prior art cited above, the object of the invention is to specify a method for processing transitional regions in a digital picture signal, which operates as far as possible at the sampling clock rate of the respective picture signal, is easy to implement in terms of circuitry and, in particular, manages without complex circuits to identify transitions (edges) in the picture signal.

In contrast to the method known from the prior art, the method according to the invention and having the features of Claim 1 has the advantage that it processes each pixel individually at the normal sampling clock rate and, to this extent, is easy to implement in terms of circuitry. With regard to the processing of a pixel, the position of this pixel within a transition is irrelevant. There is no need for circuit elements for definition of what is a transition in the picture signal and to detect such a transition in the picture. This characteristic of the method also provides insensitivity to noise occurring in the picture signal.

The measures described in the dependent claims allow further improvements in the method. On the basis of the method according to the invention, a transitional region is defined simply by the maximum and minimum pixel values in the processing block under consideration. Splitting the transitional region defined in this way into upper and lower sections according to Claim 2 makes it easy to allocate correction values to increase the gradient of the transition. In this case, the processing pixel value is allocated a positive correction value if said processing pixel is located in one of the upper sections of the transition and, accordingly, is allocated a negative correction value if said processing pixel value is in one of the lower sections of the transition. This results in the gradient of the transition being increased in a simple manner.

The splitting of the defined transitional region into upper and lower sections is accomplished in a simple manner by determining the mean value between the minimum and maximum pixel values in the processing block and using this mean value as a boundary between the upper and lower sections.

The method can advantageously be used to increase the edge gradient in a picture signal. In this case, the picture signal is predominantly a luminance signal of a video signal.

For the situation where the edge gradient of a luminance signal is increased, it is advantageous if the respective correction value for the processing pixel value is chosen as a function of the difference between the maximum and minimum pixel values. In this case, the edge gradient increasing function can gradually tend to zero if the difference between the maximum and minimum pixel values likewise tends to zero. This also makes it possible to use the edge gradient increasing measure to avoid the undesirable effect of unnaturally acting human faces in a video picture.

The measures according to Claim 6 are advantageous for a specific implementation of the method for luminance signals. As a result of the fact that the specified transfer function, with whose aid the pixel values of the transition are corrected, has sections with different gradients, in particular two gradients which differ substantially from zero, undesirable aliasing effects at the higher frequencies are avoided in the picture.

The method can also advantageously be used to improve the colour transitions in a picture signal, as is claimed in Claim 9. Aliasing effects at the higher horizontal frequencies of the chrominance signal are less easily visible by the human eye, so that in this case it is possible to simplify the method. A simplified method, which is easy to implement, is claimed in Claim 10.

The measure according to Claim 11 leads to a further simplification of the downstream switching units. The increase in the number of sample values by a factor of 2 specifically results in the capability to use the same processing clock rate in the downstream circuit parts for processing the luminance and chrominance signals (for example conversion of these signals into corresponding RGB signals).

DRAWINGS

Exemplary embodiments of the invention are explained in more detail in the following description, and are illustrated in the drawings, in which:

FIG. 5 shows a detailed block diagram for a second part of the edge gradient increasing method;

FIG. 6 shows the representation of a transfer function for a method for improving the colour transitions in a video picture;

FIG. 7 shows a processing block for the method for improving the colour transitions in a video picture;

DESCRIPTION OF THE INVENTION

Figure 1:
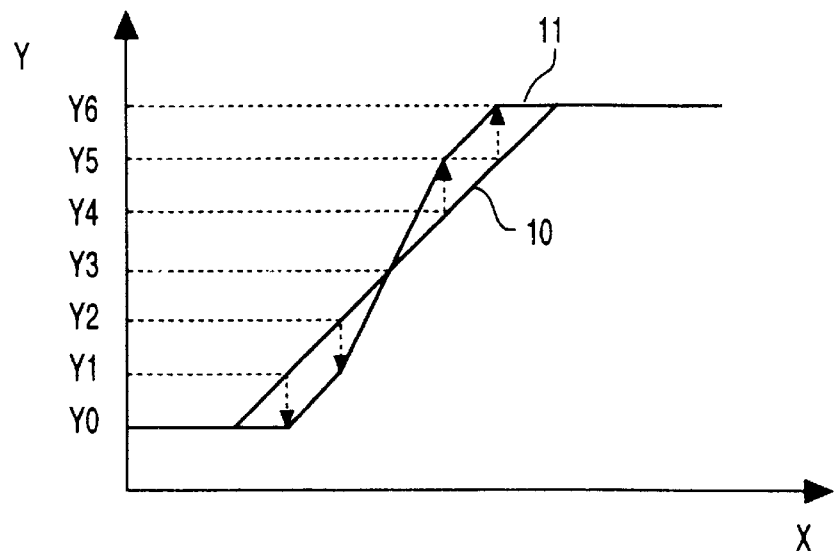
FIG. 1 shows the representation of a transfer function for a method for edge gradient increasing in a video signal.
Figure 2:
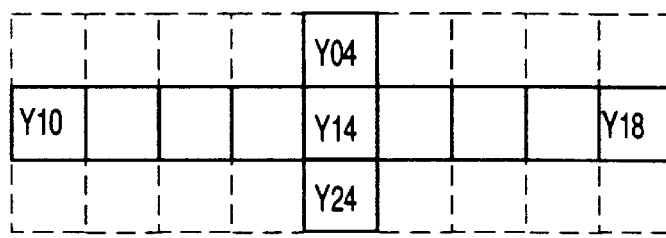
FIG. 2 shows a processing block for the method for edge gradient increasing in a video signal.

The invention will be described first of all on the basis of an example of a picture signal edge correction circuit. In the case of video pictures, in particular television pictures, it is generally known for the video signal (composite video signal) to be converted into a luminance signal Y and a chrominance signal C. In the case of the edge correction method used here, the luminance signal Y, which first of all is still in analogue form, is digitized by being sampled and quantized. The edge correction is then carried out using digital circuits. A precondition in the following text is thus that the luminance signal Y is fed to the edge correction circuit in digital form. The reference number 10 in FIG. 1 denotes the general form of a transition in the luminance signal Y. When the luminance signal is output to a colour picture tube, such transitions in the end lead to a representation of an edge in the picture, that is to say it is possible to identify a sudden change from a relatively dark region in the picture to a bright region in the picture. The luminance values of the various pixels are shown in the ordinate in FIG. 1. Y0 denotes the lowest luminance value. Y6 denotes the highest luminance value that occurs. The abscissa in FIG. 1 virtually represents a position coordinate, that is to say the numbers of the pixels of a video line are plotted on the X-axis, in which case, for simplicity, the splitting of the luminance signal into different pixels is not illustrated in detail. The illustrated transition 10 is formed by relatively few pixel elements (in the order of magnitude of nine pixel elements). The band limiting of the luminance signal (for example to 5 MHz in the case of transmitted television pictures) leads to the loss of the capability to transmit a number of fine details in the luminance signal in more detail, and the transition therefore has the linear profile illustrated in FIG. 1. Postprocessing of such transitions is thus desirable in order to increase the contrast at such picture edges. The method used here for picture edge correction is carried out by postprocessing the luminance signal in such a manner that the transition has the form denoted by the reference number 11 in FIG. 1. The procedure for doing this is as follows: first of all, in a block of adjacent pixel values, those pixels having the minimum and maximum luminance values are determined. FIG. 2 shows the processing block relating to this. In FIG. 2, Y10 denotes, for example, a pixel value which occurs at the zero position in line 1. Accordingly, for example, Y14 denotes the pixel value which occurs in the fifth position in the processing block in line 1. Overall, the processing block comprises the nine successive pixel values in a central line and the pixels Y04 and Y24 adjacent to the pixel numbered Y14 in the vertical direction. Such a processing block is used to calculate a corrected pixel value for the pixel Y14 located in the centre. When calculating the next corrected pixel value, the processing block is in practice shifted such that the pixel which now has the number Y15 is then located in the centre of the new processing block.

First of all, the minimum and maximum pixel values in the processing block are determined. However, in this case, only the pixel values numbered Y10 to Y18 and Y04 as well as Y24 are considered. According to FIG. 1, Y6 is the maximum luminance value that occurs for the pixels, and Y0 is the minimum luminance value that occurs. The mean value between the minimum and maximum pixel values is determined in the next step. This value corresponds to the value Y3 in FIG. 1. The defined mean value Y3 splits the transition into an upper section and a lower section. Next, the upper and lower sections are split in a sensible manner into finer sections. This is done by determining the greatest difference, in terms of magnitude, between two adjacent pixel values in the processing block. The value obtained in this way is also subtracted from the difference between the maximum pixel value Y6 and the minimum pixel value Y0, and the result is divided by four. This produces a parameter P by means of which the further splitting of the upper section and lower section of the transition is carried out. This results in the split shown in FIG. 1, with the limit values Y1, Y2, Y3, Y4 and Y5. A determination is then made as to the lower section in which the processing pixel value Y14 is located. Based on this, this processing pixel value is allocated a correction value which is either positive or negative. As is shown in FIG. 1, the correction value in the upper sections of the transition is positive while, in contrast, in the lower sections it is negative. Finally, the correction value obtained in this way is added to the original processing pixel value Y14.

It can clearly be seen from FIG. 1 that, for a luminance value which is located in the section between the values Y5 and Y6, a correction value is determined which allocates a value virtually equal to the luminance value Y6 to the processing pixel value. A corresponding situation applies to the section between the luminance values Y0 and Y1. In this case, the processing pixel value is allocated a value which corresponds virtually to the luminance value (Y0). In the section Y1 to Y2, the processing pixel value is allocated a correction value such that the resultant pixel value virtually lies on a linear function which is shifted downwards and has the same gradient as the original transition. A corresponding situation applies once again to the section between the values Y4 and Y5. However, in this case, a correction value is determined which shifts the processing pixel value upwards. If the luminance value of the processing pixel value is located in the sections between the values Y2 and Y3, a negative correction value is thus determined which maps the processing pixel value onto a linear function which has a gradient which is greater by a factor of 2 than the gradient of the linear function of the original transition. This linear function runs through the mean value Y3 of the transition. A corresponding situation applies to a processing pixel value which is located in the section between the values Y3 and Y4. However, in this case, the processing pixel value is shifted upwards. A specific example for a mathematical implementation of the method is quoted below, on the basis of formulae. In this case, the allocation of correction values in the various sections is described with the aid of the "if-then-else" instruction. This instruction is well known to the person skilled in the art, from many computer programming languages. It should be mentioned that the value UC_ER_CTRL used represents a parameter which can be chosen and may assume the integer values from −128 to +127. The value to be used here is determined once for the algorithm. This optimization of this parameter then takes place during product development, for example for a specific television chassis with a specific colour picture tube. For optimum operation, this parameter value will frequently lie in the vicinity of the value 0. If the value −128 is chosen for UC_ER_CTRL, this means that the edge gradient increasing function is switched off. This can easily be seen from the formula for the intermediate value ER_GAIN and YER. The luminance values for Y0 and Y6 in the case of the example under consideration here relate to integer values in the range from 0–128.

Computation algorithm:

YI=Y14

YO=MIN(Y04, Y10, Y11, Y12, Y13, Y14, Y15, Y16, Y17, Y18, Y24)

Y6=MAX(Y04, Y10, Y11, Y12, Y13, Y14, Y15, Y16, Y17, Y18, Y24)

A=|Y11−Y10|, B=|Y12−Y11|, C=|Y13−Y12|,

D=|Y14−Y13|,

E=|Y15−Y14|, F=|Y16−Y15|, G=|Y17−Y16|,

H=|Y14−Y10|,

I=|Y24−Y14|, J=|Y04−Y14|

M=MAX(A, B, C, D, E, F, G, H, I, J)

Y3=(Y0+Y6)/2

N=(Y6−Y0)

P=(N−M)/4

Y1=Y0+P, Y2=Y3−P, Y4=Y3+P, Y5=Y6−P

|      | If (Y0<=YI<Y1)   | DY=Y0-Y1     | Gradient 0 |
|------|------------------|--------------|------------|
| else | if (Y1<=YI<Y2)   | DY=Y0-Y1 = −P | Gradient 1 |
| else | if (Y2<=YI<Y3)   | DY=YI-Y3     | Gradient 2 |
| else | if (Y3<=YI<Y4)   | DY=YI-Y3     | Gradient 2 |
| else | if (Y4<=YI<Y5)   | DY=Y6-Y5 = P | Gradient 1 |
| else |                  | DY=Y6-Y      | Gradient 0 |

ER_GAIN=MAX(MIN(|N/2|+UC_ER_CTRL, 128), 0)

Finally:

YER=YI+((ER_GAIN)*DY)/128

Figure 3:
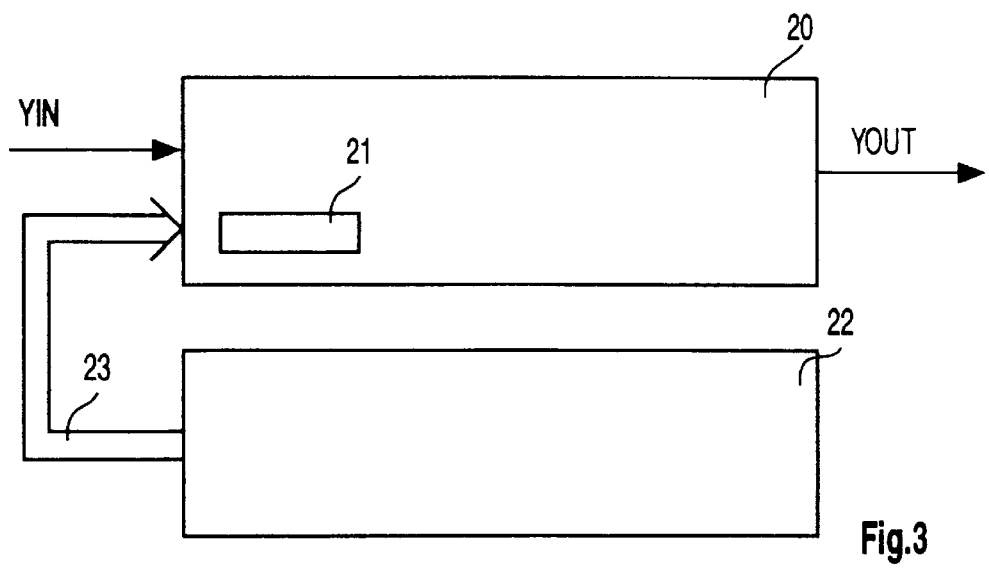
FIG. 3 shows a rough block diagram for an apparatus for carrying out the method for edge gradient increasing in a video signal.

The described method is carried out by a circuit in the video signal receiver. FIG. 3 shows a rough block diagram of this circuit. The reference number 20 denotes the actual correction circuit which carries out the previously described computation algorithm for each processing pixel value. The reference number 21 denotes a control register in which the optimized parameter UC_ER_CTRL is entered. The reference number 22 denotes a control unit. This control unit 22 is used, for example, to programme the parameter UC_ER_CTRL into the control register 21. For this purpose, the control unit 22 is connected to the correction circuit 20 via an address, data and control bus 23. The correction circuit 20 operates at the same sampling clock rate as that for sampling the analogue signal. The corrected pixel values are thus present at the output YOUT of the correction circuit 20 at the same clock rate as is used to read them to the correction circuit 20 via the input YIN.

Figure 4:
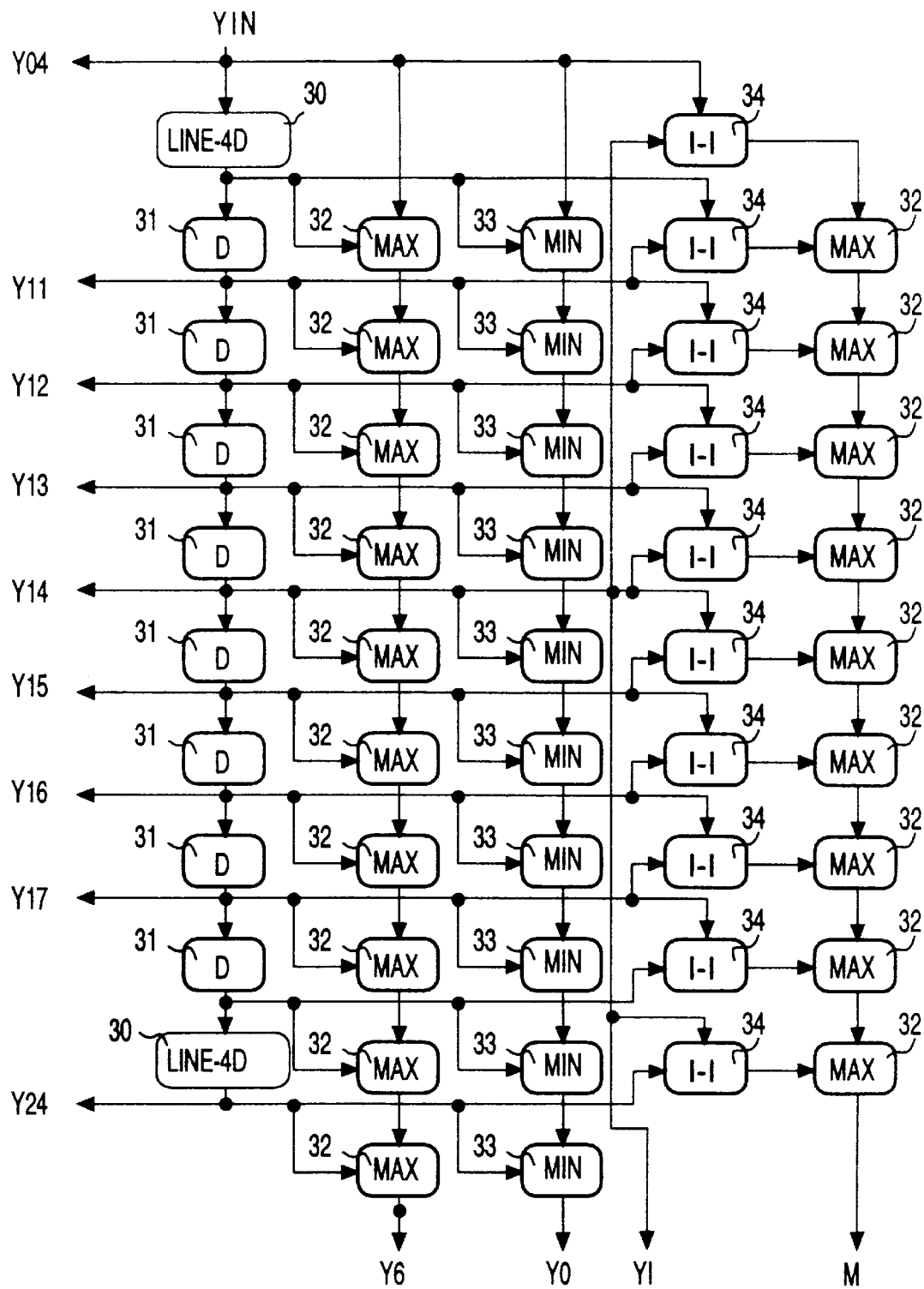
FIG. 4 shows a detailed block diagram for a first section of the edge gradient increasing method.

The search for the maximum and minimum luminance values in the processing block and the search for the maximum difference values between two adjacent pixel values are carried out in the correction circuit 20, using a circuit which is illustrated in FIG. 4. The reference number 30 virtually denotes a shift register memory in which all the pixel values numbered Y05–Y10 are stored. Thus, the pixel value numbered Y10 is present at the output of this circuit. The reference number 31 in each case denotes a memory location for a pixel value. The luminance values present at the output of the respective stages 31 are in each case indicated at the left-hand edge of the illustration. All the stages 30, 31 and 30 are organized as shift register memories. The luminance value for the pixel Y24 is then present at the output of the last shift register memory 30. The reference number 32 denotes the maximum value selection circuits. The first column of maximum value evaluation circuits 32 denotes the selection of the maximum luminance value Y6 in the processing block under consideration. The reference number 33 denotes minimum value selection circuits. As is indicated in FIG. 4, the column with the minimum value selection circuits 33 determines the minimum luminance value Y0. The reference number 34 denotes subtraction and magnitude forming stages. One of the values A, B, C–J is calculated in each of the stages. The greatest of these values is determined with the aid of the maximum value evaluation circuits 32 in the last column. The determined values Y6, Y0, YI and M are thus present at the outputs of the circuit according to FIG. 4. These values are passed onto the next processing stage.

This next processing stage is illustrated in FIG. 5. The reference number 35 in FIG. 5 denotes invertors. Adder circuits in FIG. 5 are denoted by the reference number 36. Furthermore, a circuit is also indicated which results in addition of the input data, with subsequent division by the value 4. These processing stages have the reference number 38. The reference number 37 denotes a processing stage which performs addition of the input values and subsequent division by the value 2. The reference number 39 denotes a processing stage in which the magnitude of the input value is formed, and this value is divided by 2. Finally, the reference number 40 denotes a processing stage in which the input value is divided by the value 128. Finally, the reference number 41 also denotes a multiplication stage which multiplies the input values by one another. Maximum value selection circuits 32 and minimum value selection circuits 33 are present, once again, as further stages. The illustrated circuit carries out the previously described second part of the computation algorithm, so that the corrected luminance value for the processing pixel value Y14 is output at its output YOUT. If the circuit in FIG. 5 is considered in more detail, it can be shown that the illustrated structure of maximum value selection circuits and minimum value selection circuits corresponds to the allocation process of the previously described computation algorithm with the "if-then-else" instructions.

Next, the method according to the invention will be described using an example of a method for improving colour transitions in a video signal. FIG. 6 shows a colour transition. The reference number 10 denotes the colour transition in its original form. A position coordinate is once again plotted on the abscissa. The respective chrominance value of a pixel is in this case illustrated on the ordinate. The splitting of the abscissa into pixel values has once again been omitted for the sake of simplicity. As is known, the band limiting in the case of the chrominance signals is even more drastic than in the case of the luminance signals. The transmission band width for the chrominance element of a television signal is, for example, about 1.3 MHz. However, since the human eye reacts in as highly insensitive manner to colour transitions, the colour transitions do not need to be improved in as complex a manner, in contrast to the luminance transmissions. The method proposed here therefore uses a somewhat simplified transfer function. The transfer function which is used to correct the colour transitions has the reference number 11 in FIG. 6. The reference symbol C0 denotes the minimum chrominance value of the transition. The reference number C4 denotes the maximum chrominance value of the transition. The reference value C2 denotes the mean value between the maximum chrominance value C4 and the minimum chrominance value C0. The mean value C2 is once again used to distinguish between the upper and lower sections of the transition. The upper section and the lower section are in this case each split into only two sections. Only a sequence of nine successive pixel values in a video line is considered here as the processing block. The corresponding processing block is illustrated in FIG. 7.

The method used to improve the colour transition is virtually the same as for the previously described edge correction. For a current processing pixel value which corresponds to the value C04 in the processing block illustrated in FIG. 7, a determination is once again carried out to find the section in which the transition of the associated chrominance value is located. If the chrominance value C04 is located in the section between the values C0 and C1, then it is allocated a negative correction value, which maps the original processing pixel value onto the linear function which is illustrated in FIG. 6 and has a small gradient. A corresponding situation applies to a processing pixel value which is located in the section between the chrominance values C3 and C4. However, a positive correction value is allocated here. For processing pixel values which are located in the section between the chrominance values C1 and C2, values are allocated which map the current processing pixel value onto the linear function which is illustrated in FIG. 6 and has a gradient which is increased by a factor of approximately 4 in comparison with the original transition. The negative correction values are allocated in this section. In contrast, a corresponding positive correction value is allocated in the first upper section between the chrominance values C2 and C3.

The following text discloses the specific mathematical implementation of the described method for improving colour transitions, on the basis of formulae.

Computation algorithm:

CI0=C04

CI1=(C04+C05)/2

C0=MIN(C00, C01, C02, C03, C04, C05, C06, C07, C08)

C4=MAX(C00, C01, C02, C03, C04, C05, C06, C07, C08)

C2=(C0+C4)/2

N=(C4−C0)

P=N/8

C1=C0+P, C3=C4−P

|      | If (C0<=CIO<C1)  | DC0= (C0-CI0)   |
|------|------------------|-----------------|
| else | if (C1<=CIO<C2)  | DC0= 3*(CI0-C2) |
| else | if (C2<=CIO<C3)  | DC0= 3*(CI0-C2) |
| else |                  | DC0= (C4-CI0)   |
|      | If (C0<=CI1<C1)  | DC1= (C0-CI1)   |
| else | if (C1<=CI1<C2)  | DC1= 3*(CI1-C2) |
| else | if (C2<=CI1<C3)  | DC1= 3*(CI1-C2) |
| else |                  | DC1= (C4-CI1)   |

Finally:

CTI0=CI0+((UC_CTI_GAIN)*DC0)/64

CTI1=CI1+((UC_CTI_GAIN)*DC1)/64

The algorithm is designed such that two chrominance values CTI0 and CTI1 are in each case calculated as output values. Two corrective chrominance values are thus present at the output per processing pixel value. This doubling of the sampling frequency is carried out in order that the downstream stages can operate at the same clock frequency. The increase in the sampling rate ratio in the manner 4:4:4 then specifically corresponds to an increase in the sampling rate of the luminance signal Y in comparison with the colour difference signals U, V, since, as is known, the colour difference signals in the present-day 4:2:2 television systems are obtained at half the sampling rate in comparison with the luminance sampling rate. If the output corrected luminance values and chrominance values are now converted into corresponding RGB signals and, finally, are output via D/A converters to the colour picture tube, then this circuit is considerably simplified since the calculation conversions and D/A conversions can all be carried out at the same clock frequency.

The parameter UC_CTI_GAIN used in the computation algorithm is once again used for the purpose of optimizing the method for improving colour transitions in product development for a specific television chassis and a specific colour picture tube.

Figure 8:
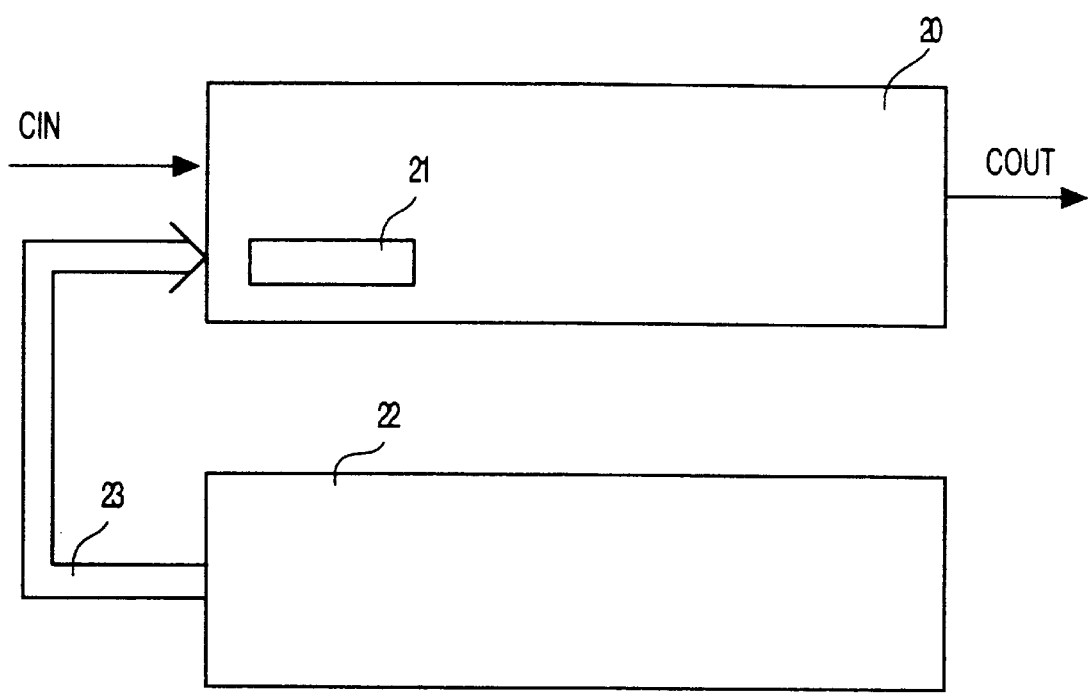
FIG. 8 shows a rough block diagram for an apparatus for carrying out the method for improving the colour transitions in a video picture.

The circuitry implementation of the method is very similar to the circuitry implementation of the previously described edge correction method. FIG. 8 shows the rough block diagram of this circuit. The same reference numbers in this case denote the same items as in FIG. 3.

Figure 9:
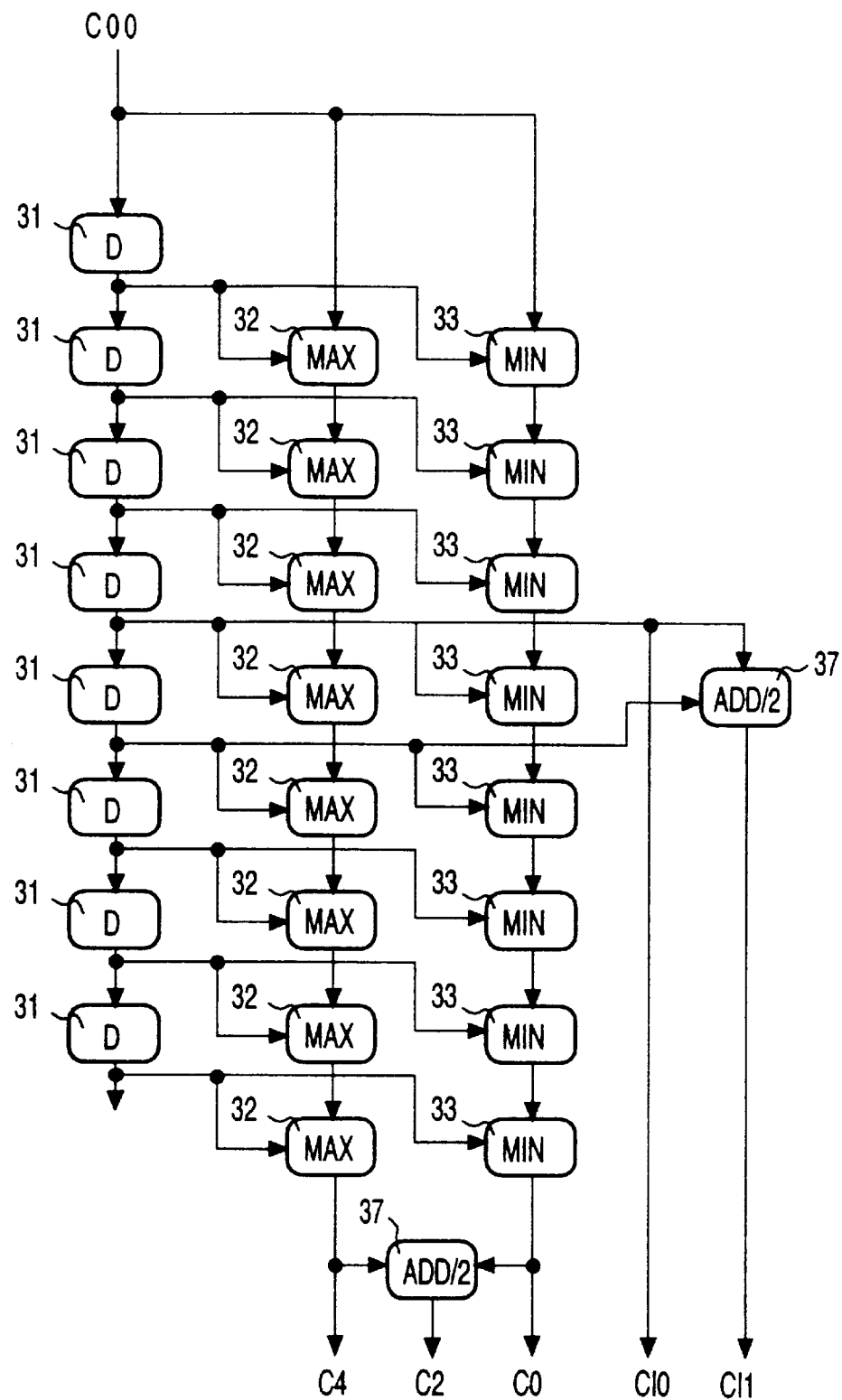
FIG. 9 shows a detailed block diagram for a first section of the method for improving the colour transitions in a video picture.

FIG. 9 once again shows a first circuit part which is used to determine the maximum and minimum values as well as the intermediate values CI0 and CI1 and the mean value C2. Once again, the same reference numbers denote the same components as in FIG. 4.

Figure 10:
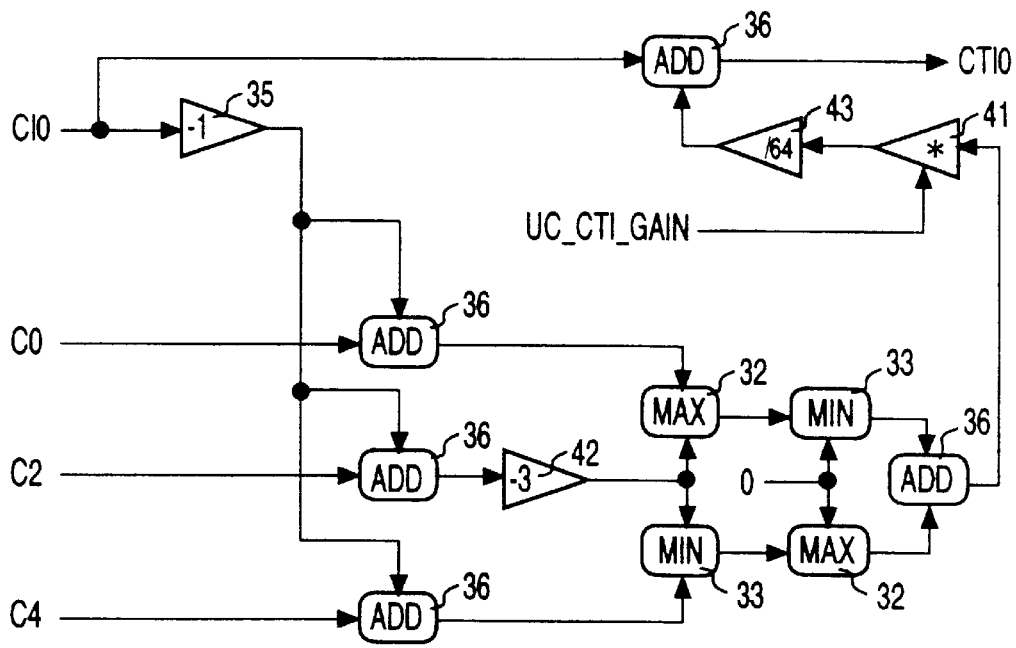
FIG. 10 shows a detailed block diagram for a second section of the method for improving the colour transitions in a video picture.
Figure 11:
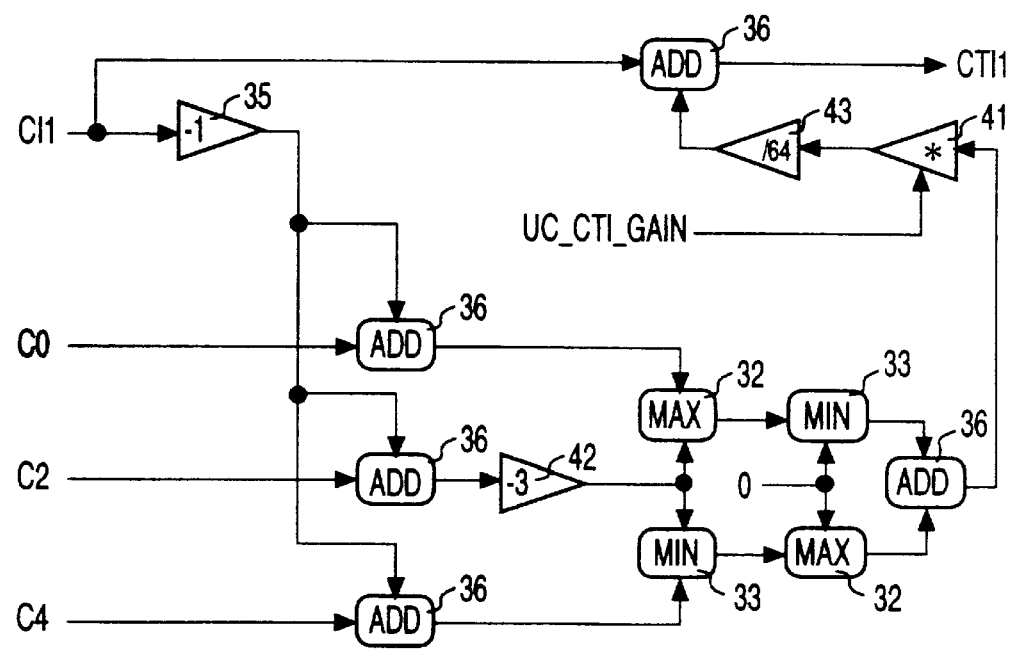
FIG. 11 shows a detailed block diagram for a third section of the method for improving the colour transitions in a video picture.

The circuit parts for calculating the output values CTI0 and CTI1 are illustrated in FIGS. 10 and 11. Once again, the reference numbers in these figures are taken from the preceding figures. The reference number 42 denotes a multiplier stage which multiplies the input value via the factor −3. The reference number 43 denotes a processing stage which divides the input value by the factor 64. The method of operation of the two circuit stages can be seen in each case directly from the respective figures. The described circuit implementations each represent optimized versions of the method according to the invention.

The method may be modified in many ways. For example, the processing blocks may be chosen differently for other implementations. Thus, the pixel values under consideration may be extended, for example, such that 5, 7 or 9 vertically adjacent pixel values are considered in the processing block. The computation algorithms and the corresponding circuit parts must then, of course, also be changed. As a transition region, it is also, of course, possible to consider a transition which, contrary to the illustrations in FIGS. 1 and 6, changes from a region with high pixel values to a region with low pixel values.

The method can be used in a multiplicity of television signal receivers. Alternatively, it can be used for picture improvement measures for computer monitors, etc.

What is claimed is:

1. Method for processing transitional regions in a picture signal, the picture signal comprising a sequence of digital pixel values, comprising the steps of:

forming a processing block with a processing pixel value for which a corrected pixel value is to be calculated and a number of adjacent pixel values, which surround said processing pixel value;

determining the maximum and minimum pixel values in the processing block;

defining the transitional region in said processing block by building a group of pixel values inclusive and in between the maximum and minimum pixel values;

determining the mean value between the maximum and minimum pixel values;

splitting the transitional region into at least one upper and lower section, wherein the mean value represents the border between upper and lower section;

assigning the processing pixel value to one of the upper and lower sections or to the mean value;

allocating a corresponding correction value to the processing pixel value, in accordance with a predetermined transfer function having at least one corresponding lower and upper section, in order to increase, to reduce or to leave unchanged the processing pixel value.

2. Method according to claim 1, further comprising:

allocating a positive correction value to the processing pixel value when said processing pixel value is in one of the upper sections of the transition, and allocating a negative correction value to the processing pixel value when said processing pixel value is in one of the lower sections of 35 the transition.

3. Method according to claim 1, wherein the edge gradient in the picture signal is increased, and the picture signal corresponds to a luminance signal of a video signal.

4. Method according to claim 1, wherein allocating a corresponding correction value comprises:

determining the difference between the maximum and minimum pixel values; and choosing a correction value as a function of the difference between the maximum and minimum pixel values.

5. Method according to claim 1, wherein the step of splitting the transitional region comprises:

splitting the transition region into six sections, and the transfer function has an approximately constant profile in the first lower section and the third upper section, having a linear profile at a first gradient in the second lower section and the second upper section, and having a linear profile at a second gradient in the third lower section at the first upper section; and choosing the magnitude of first gradient to be less than the magnitude of the second gradient.

6. Method according to claim 5, wherein the first gradient corresponds to the gradient of the unprocessed transition and the second gradient corresponds to the gradient of the unprocessed transition increased by a factor of about 2.

7. Method according to claim 1, wherein forming a processing block comprises:

selecting a matrix of pixel values from three successive video lines each having nine successive pixel values, the processing pixel value being located in the center of the matrix of pixels values.

8. Method according to claim 1, wherein color transitions in the picture signal are improved, and the picture signal corresponds to a chrominance signal of a video signal.

9. Method according to claim 8, further including:

splitting the transitional region into four sections, and the transfer function having a linear profile at a third gradient in the first lower section and the second upper section, and having a linear profile at a fourth gradient in the second lower section and the first upper section; and choosing the magnitude of the third gradient to be less than the magnitude of the fourth gradient.

10. Method according to claim 9, wherein the fourth gradient corresponds to the gradient of the unprocessed transition increased by a factor of 4.

11. Method according to claim 8, wherein the processing block includes nine successive pixel values in a video line and the method further comprises:

locating the processing pixel value in the center of the nine pixel values.

12. Method according to claim 1, further comprising:

calculating a further pixel value (CT11) in addition to the processing pixel value (C04), which further pixel value (CTI1) is located between the processing pixel value (C04) and the subsequent pixel value (COS), in order to improve the resolution of the chrominance signal.

* * * * *